UNITED STATES PATENT OFFICE.

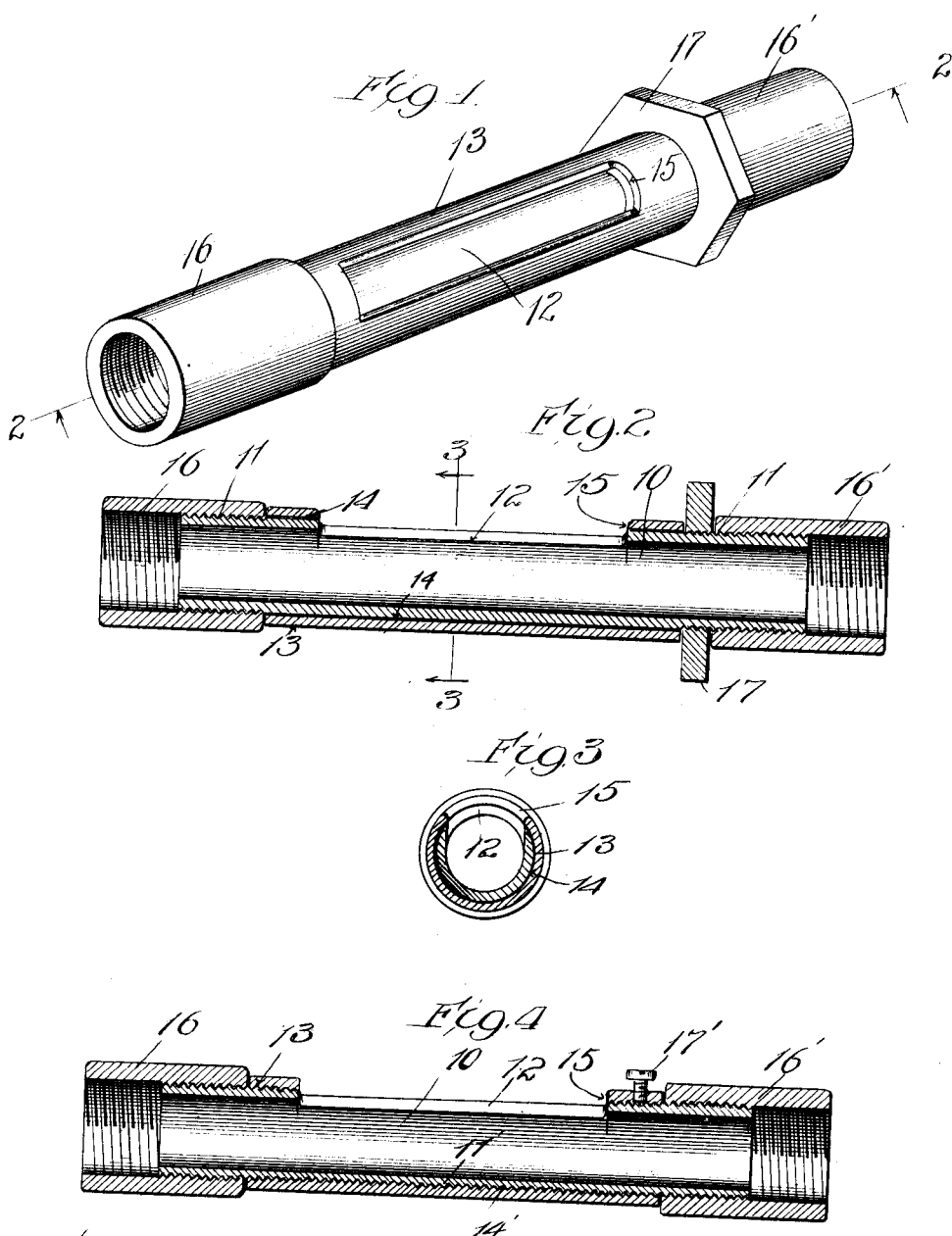

BIRD M. GRAYBILL, OF CHICAGO, ILLINOIS.

ELECTRIC-CONDUIT FITTING.

1,034,909.     Specification of Letters Patent.     Patented Aug. 6, 1912.

Application filed May 4, 1909. Serial No. 493,892.

*To all whom it may concern:*

Be it known that I, BIRD M. GRAYBILL, a citizen of the United States, residing at Chicago, in the county of Cook and State of Illinois, have invented certain new and useful Improvements in Electric-Conduit Fittings, of which the following is a specification.

My invention relates to improvements in electric conduit fittings, and has for its general object to produce a fitting for installation in electric conduit systems for providing an opening for giving access to the interior of the conduit to permit of pulling in wires, making joints, and like uses, and providing a closure for such opening permanently attached to the body of the fitting.

Particularly an object of my invention is to provide a fitting of small size, low cost, and adapted for easy installation, so that such fittings may be installed with small expense at comparatively frequent intervals in the run of conduit, in order that long pulls may be unnecessary in wiring a building or that joints may be easily made, or for other purposes for which it has been heretofore necessary or customary to use outlet or junction boxes, often large and cumbersome in size and of relatively great cost.

In general my invention contemplates the provision of a fitting comprising a body having an interior bore of suitable size in proportion to the conduit for interposition between two conduit sections, and provided with a side opening to give access to its interior, means for closing or uncovering the opening at will, and, preferably, couplings for attaching the body to the adjoining conduit sections, and means for locking the closure in set position.

In the specific showing of the drawings: Figure 1 is a perspective view of an embodiment of the invention; Fig. 2 is a longitudinal section on line 2—2 thereof; Fig. 3 is a cross section on line 3—3 of Fig. 2; Fig. 4 is a longitudinal sectional view of a modified embodiment of the invention.

In the drawing, Figs. 1 to 3 represent an embodiment of the invention particularly suited to ordinary interior work, and Fig. 4 represents a fitting for use in conjunction with what is known as "marine" work where the conduit is exposed to the action of weather or water.

Referring to the drawing, 10 indicates the tubular body of the fitting of elongated, cylindrical form, preferably made of a piece of piping, exteriorly screw-threaded as at the ends 11—11 of Fig. 2, or throughout its entire length, as shown at 11' in Fig. 4, said body having therein a side opening 12, preferably longitudinally extended, and of a width equal to the full diameter of the interior of the body.

13 indicates a cover or closure member in the form of a sleeve mounted for rotation on the body 10, interiorly smooth as shown at 14 in Fig. 2, to fit upon the smooth mid-portion of the fitting intended for interior work, or interiorly screw threaded as shown at 14' in Fig. 4 to interfit with the threads 11' of the fitting for marine work. Such rotatable cover 13 has therein an aperture 15 preferably made for precise registry with the opening 12 of the body 10. Obviously when the openings 12—15 are brought into registry, the interior of the fitting is open to access, while when the cover part is rotated to throw the apertures 12—15 out of registry the body is closed.

Coupling members 16, 16' are preferably provided upon opposite screw-threaded ends of the body 10 to hold the closure member 13 against longitudinal movement on the body and effect connection of the body with the adjoining conduit sections, not shown.

While lock nuts may be dispensed with and the couplings 16, 16' alone depended on to preserve the desired relation of the parts, I prefer that in the interior fittings as shown in Figs. 1 to 3, a lock nut 17 be screwed upon one of the threaded ends of the body for position between one coupling, as 16', and the rotatable sleeve 13. If preferred, however, a set screw 17' may be substituted, as indicated in Fig. 4.

Where used for wire pulling, the fitting may have the same interior core as the conduit, and in such case only slightly increases the space requirement for installation, and for junction purposes a larger size fitting may be employed and reducers used to connect couplings 16, 16' with the smaller sized conduit.

Having thus described my invention, what I claim is:

1. In a conduit fitting for application between the exteriorly screw-threaded ends of a conduit, a tubular body adapted to lie as a continuation of the conduit to form between said conduit ends an interior surface in alinement with the interior surface of the conduit, said tubular body providing therein an aperture for access to the interior thereof, and having exterior screw-threads, a sleeve upon said tubular body, having therein an aperture for register with the aperture in the tubular body, said sleeve being rotatable upon said tubular body to bring said apertures into or out of register, and couplings for said tubular body in alinement with the sleeve, interiorly screw-threaded for co-action with the exteriorly threaded ends of the conduit and the tubular body to secure said body in place and to maintain said sleeve in position upon said body.

2. In a conduit fitting, a tubular body adapted to form a continuation of the interior of a conduit, provided with a side opening for access to its interior, a rotatable means for closing or opening said aperture, carried by said body, and means on each side of said closure means for connecting said body with adjoining conduit sections, rotatable to lock said closure means in open or closed position by end abutment there-against.

3. In a conduit fitting for application between the exteriorly screw-threaded ends of a conduit, a tubular body adapted to lie as a continuation of the conduit to form between said conduit ends an interior surface in alinement with the interior surface of the conduit, said tubular body providing therein an aperture for access to the interior thereof, and having exterior screw-threads, a sleeve upon said body having therein an aperture for register with the aperture in the tubular body, said sleeve being rotatable upon said tubular body to bring said apertures into or out of register, couplings interiorly screw-threaded for co-action with the ends of the conduit and tubular body to secure said body in place, and means associated with said body and sleeve to maintain said sleeve in any desired position of rotation.

4. In an electric conduit fitting for use between two opposing conduit ends exteriorly screw-threaded, the combination of a tubular body exteriorly screw-threaded at its ends, couplings connecting said body and the conduit ends, a sleeve rotatable upon the said tubular body spanning the distance between the coupling ends in substantially longitudinal alinement with the couplings; said body and sleeve being provided with registering apertures to afford access to the interior of the fitting, and means operable by rotation upon said tubular body to lock said sleeve in predetermined position.

5. In an electrical conduit fitting, an exteriorly screw threaded tubular body having a side opening therein, an interiorly screw threaded sleeve rotatable thereon and having a side opening therein, and an interiorly screw-threaded coupling at each end of the sleeve, whereby rotation of the sleeve in a direction to open or close the opening in the tubular body may bring said sleeve into engaging contact with a coupling.

6. In an electrical conduit fitting, a tubular body having a side opening therein and being exteriorly screw threaded, a sleeve rotatable on the body and having a side opening therein, and exterior couplings screwed upon therein, and the ends of the tubular body, abutting against the sleeve.

In testimony whereof I hereunto set my hand in the presence of two witnesses.

BIRD M. GRAYBILL.

In the presence of—
GEO. T. MAY, Jr.,
MARY F. ALLEN.